United States Patent [19]

Gassen et al.

[11] Patent Number: 5,218,755
[45] Date of Patent: Jun. 15, 1993

[54] METHOD OF MANUFACTURING A MAGNETIC HEAD

[75] Inventors: Helmut J. Gassen; Eugène L. M. Raemaekers; Wilhelmus J. M. Smits, all of Eindhoven, Netherlands

[73] Assignee: U.S. Philips Corporation, New York, N.Y.

[21] Appl. No.: 828,272

[22] Filed: Jan. 30, 1992

[30] Foreign Application Priority Data

Feb. 4, 1991 [NL] Netherlands ................. 9100191

[51] Int. Cl.⁵ .............................................. G11B 5/42
[52] U.S. Cl. ......................................... 29/603; 29/593; 360/113
[58] Field of Search ............... 29/603, 593; 360/113, 360/122, 125-127

[56] References Cited

U.S. PATENT DOCUMENTS

| | | | |
|---|---|---|---|
| 3,710,235 | 1/1973 | Barrager et al. | 29/603 X |
| 3,787,964 | 1/1974 | Simon et al. | 29/603 |
| 3,821,815 | 6/1974 | Abbott et al. | 29/603 X |
| 4,052,748 | 10/1977 | Kuijk . | |
| 4,689,877 | 9/1987 | Church | 29/603 |
| 5,065,483 | 11/1991 | Zammitt | 29/603 |

FOREIGN PATENT DOCUMENTS 52-1481035  9/1977  Japan .
8901373  5/1989  Netherlands .

OTHER PUBLICATIONS

Philips Technical Review, vol. 44, No. 6, Dec. 1988, pp. 169–178, Heijman & Al; "Multi-Track Magnetic Heads in Thin-Film Technology".
Patent Abstracts of Japan, vol. 2, No. 27, E-77 [11990] Feb. 21, 1978.

Primary Examiner—Carl E. Hall
Attorney, Agent, or Firm—John C. Fox

[57] ABSTRACT

Method of manufacturing a magnetic head having a tape contact face (5) with transducing gaps, which method starts from a substrate (1) on which a magnetic head structure is formed layer by layer. A magnetic head structure comprises magnetoresistive elements (E1–E11) connected each to first connection faces (13a, 13b) by means of at least two first connection tracks (11a, 11b), and flux guides (19a, 19b) for cooperating with the magnetoresistive elements. An electrically conducting uninterrupted layer (27) extending parallel to the tape contact face to be formed is provided during formation of the magnetic head structure, which layer is interrupted locally when the tape contact face is being formed so as to define spatially separated electric conductors for biasing at least one magnetoresistive element. Each electric conductor is connected to second connection faces (17a, 17b) by means of at least two second connection tracks (15a, 15b).

2 Claims, 3 Drawing Sheets

METHOD OF MANUFACTURING A MAGNETIC HEAD

BACKGROUND OF THE INVENTION

The invention relates to a method of manufacturing a magnetic head having a tape contact face and transducing gaps, which method starts from a substrate on which a magnetic head structure is formed layer by layer, said structure comprising magnetoresistive elements connected each to first connection faces by means of at least two first connection tracks, and flux guides for cooperating with the magnetoresistive elements.

A method as described hereinbefore and a magnetic head obtained by said method are known from Netherlands Patent Application NL-A 8 901 373, published 17.12.90, herein incorporated by reference. The known magnetic head has a plurality of transducing gaps consisting at least partly of a non-magnetic material for cooperating with a magnetic information carrier, e.g. tape, which can be moved in at least one direction. The transducing gaps are provided side by side and their longitudinal direction extends parallel to the direction of movement of the information carrier. The magnetic head is intended for reading information which is present at different wavelengths and in different tracks on the information carrier, while flux guides ensure the transfer of the magnetic flux to magnetoresistive elements. The magnetic head may be used, for example, in magnetic tape apparatuses such as audio or video recorders. The magnetoresistive elements may be of a type as described in U.S. Pat. No. 4,052,748, herein incorporated by reference. For biasing the magnetoresistive elements, the known magnetic head has a plurality of electric conductors functioning as bias windings, each of which cooperates with one or several magnetoresistive elements.

In accordance with the known method, the electric conductors are arranged spatially separated from each other and each is provided with two connection tracks and connection faces when the magnetic head structure is being formed. After the complete magnetic head structure has been formed in accordance with the known method, the structure is protected by means of a counterblock. After the counterblock has been provided, the tape contact face is formed by mechanical treatments such as grinding, which does not change the magnetic head structure.

A drawback of the method is that the known magnetic head structure does not have any suitable means to enable simply performing measurements during manufacture to determine the magnetical behaviour of the magnetoresistive elements which have been provided. This drawback could be obviated by providing the magnetic head structure with an extra uninterrupted test winding extending along all magnetoresistive elements. However, such an additional electrically conducting layer would render the magnetic head more complex and would give rise to problems in connection with the limited space available, particularly due to the presence of the required connection faces. Moreover, additional method steps would be required to form such a test winding.

OBJECTS AND SUMMARY OF THE INVENTION

It is an object of the invention to provide a method in which the magnetic head structure is formed in such a way that it has a suitable configuration to enable determination of the behaviour of the magnetoresistive elements during manufacture of the magnetic head without an extra method step and/or an extra layer being required.

To this end, the method according to the invention starts from a substrate on which a magnetic head structure is formed layer by layer, said structure comprising a row of magnetoresistive elements each connected to first connection faces by means of at least two first connection tracks, and flux guides for cooperating with the magnetoresistive elements, an electrically conducting uninterrupted layer being provided during formation of the magnetic head structure, said layer being interrupted locally when the tape contact face is being formed, so as to define spatially separated second connection tracks of electric conductors for biasing at least one magnetoresistive element, each second track terminating in a second connection face.

An advantage of the method according to the invention is that the electric conductors initially form part of the uninterrupted layer and are therefore interconnected so that they can be utilized as test windings in that state during manufacture, particularly during the wafer stage, when the properties of the magnetoresistive elements are measured. The parts of the uninterrupted layer connecting the electric conductors are preferably formed in such a way that they are automatically removed when the tape contact face is being formed, by removal of material, sot that the interconnection between the conductors is interrupted and the conductors can be driven independently of each other after the tape contact face has been formed. Said parts of the uninterrupted layer therefore preferably project into the area beyond the tape contact face to be formed.

To measure magnetic and/or electrical properties of the magnetic head assembly formed, measuring pins of a measuring device are consecutively contacted with the two connection faces of each magnetoresistive element and the ends of the uninterrupted layer are to be connected to the terminals of a current source. It has been found that it has practical advantages to establish the connection, during the measurement, between the current source and the uninterrupted layer used as a test winding by means of contact pins which move synchronously with the measuring pins. To achieve this, an embodiment of the method according to the invention is characterized in that a third set of two spatially electrically conducting tracks are provided during formation of the magnetic head structure, which tracks extend parallel to and are present in an area located beyond the tape contact face to be formed, said tracks each being connected to a different end of the electrically conducting uninterrupted layer. When the measurement is being performed, each track is connected to a terminal of a current source. Each track is removed when the tape contact face is formed.

An advantage of the temporarily present electrically conducting tracks is that relatively simple measuring equipment is required, having, for example, a support with two measuring pins and two contact pins, and that the measuring procedure can be performed automatically, e.g., computer-controlled.

BRIEF DESCRIPTION OF THE INVENTION

The invention will now be described in greater detail by way of example with reference to the drawing in which:

FIG. 1 shows a layout of an embodiment of the thin-film magnetic head according to the invention, FIG. 2 is a diagrammatic cross-section taken on the line II—II transverse to the tape contact face through a transducing gap of the magnetic head of FIG. 1, and FIG. 3 shows a layout of the magnetic head of FIG. 1 in a stage of manufacture in which the counterblock has not yet been provided and the tape contact face has not yet been formed. FIG. 3 also shows diagrammatically a measuring circuit.

DESCRIPTION OF THE PREFERRED EMBODIMENT

Figure 1:
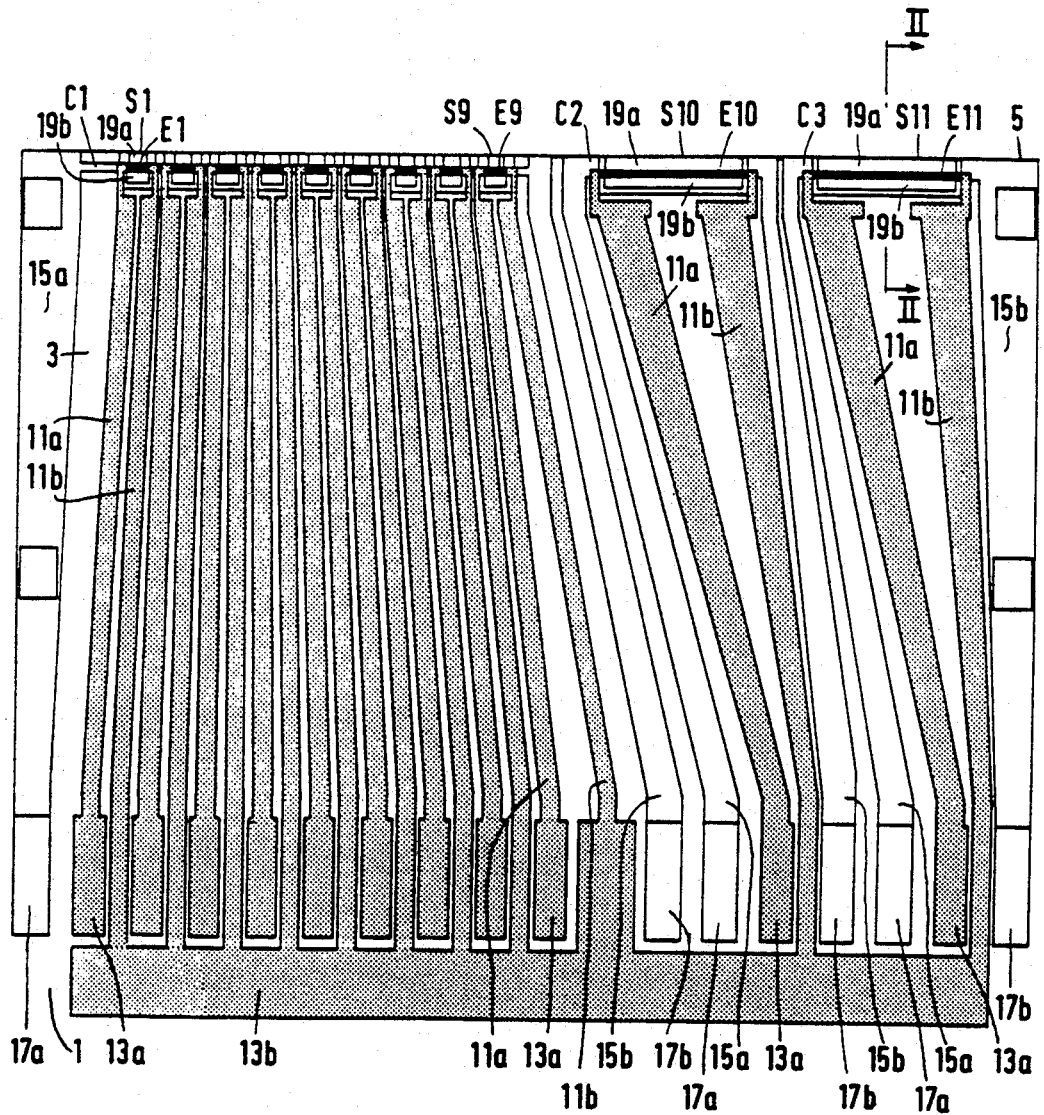
Figure 2:
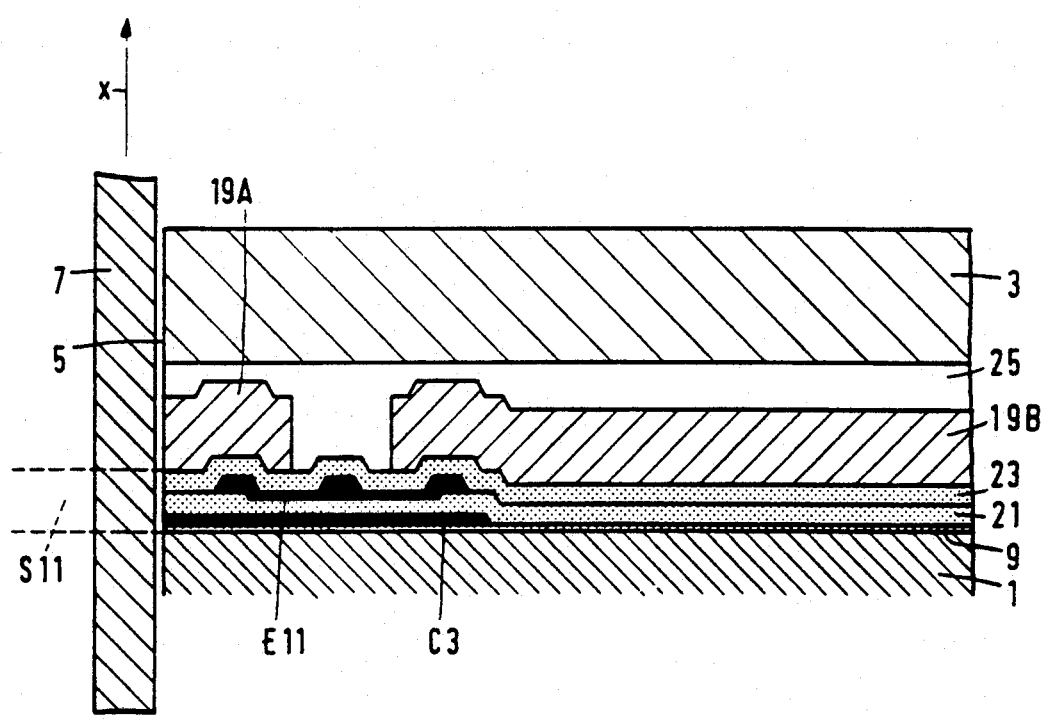

In one embodiment, the magnetic head according to the invention, shown in FIGS. 1 and 2, comprises a support or substrate 1 of a magnetic material, namely NiZnFe on which a structure of magnetic layers, electric layers and insulation layers is provided, the structure being protected by a counterblock 3. In this embodiment, the magnetic head has a tape contact face 5 with eleven transducing gaps for cooperating with an information carrier 7 which moves in a direction x along the tape contact face. A group of nine gaps S1 to S9 of the eleven transducing gaps is intended for reading information in a digital form and a group of two gaps S10 and S11 is intended for reading information in an analog form. The gaps S1 to S9 for digital use generally have a smaller gap length than the gaps S10 and S11 for analog use. Moreover, the gap length may be chosen to be such that both analog and digital information can be read through one and the same gap.

In this embodiment, the magnetic head has an insulation layer 9 provided on the substrate 1, which layer carries three electric conductors C1, C2 and C3, which may extend into the transducing gaps. The magnetic head also comprises eleven magnetoresistive elements E1 to E11, further denoted as MR elements and consisting of, for example an NiFe layer, on which conducting strips of, for example Au, have been provided for forming so-called barber poles. Each MR element E1 to E11 has a pair of connection tracks 11a and 11b, hereinafter referred to as first connection tracks which terminate in first connection faces 13a and 13b, respectively. In the embodiment shown, the eleven first connection faces 13b are interconnected. Both the first connection tracks and the first connection faces are preferably made of Au. It is to be noted that an MR element provided with a barber pole is known per se and is described, inter alia in the above-mentioned U.S. Pat. No. 4,052,748.

The electric conductors C1, C2 and C3 are used to control or bias the MR elements E1 to E9, E10 and E11, each element being provided with a pair of second connection tracks 15a and 15b, which terminate in second connection faces 17a and 17b, respectively.

The magnetic head also comprises eleven pairs of flux guides, each pair comprising a first or front flux guide 19a and, spaced apart therefrom, a second or rear flux guide 19b. The front flux guide 19a extends as far as the tape contact face 5 for cooperating with the magnetic information carrier 7. The MR elements E1 to E11 are present between the substrate 1 and the flux guides, each MR element forming a bridge between a first and a second flux guide 19a and 19b. In certain constructions and for certain uses it is possible to omit the rear flux guides.

The electric conductors, the MR elements and the flux guides are electrically insulated with respect to one another by a plurality of insulation layers denoted by the reference numerals 21 and 23 in FIG. 2. A further insulation layer 25 in the form of, for example, an adhesive layer, is present between the joint flux guides 19a and 19b and the counterblock 3.

Figure 3:
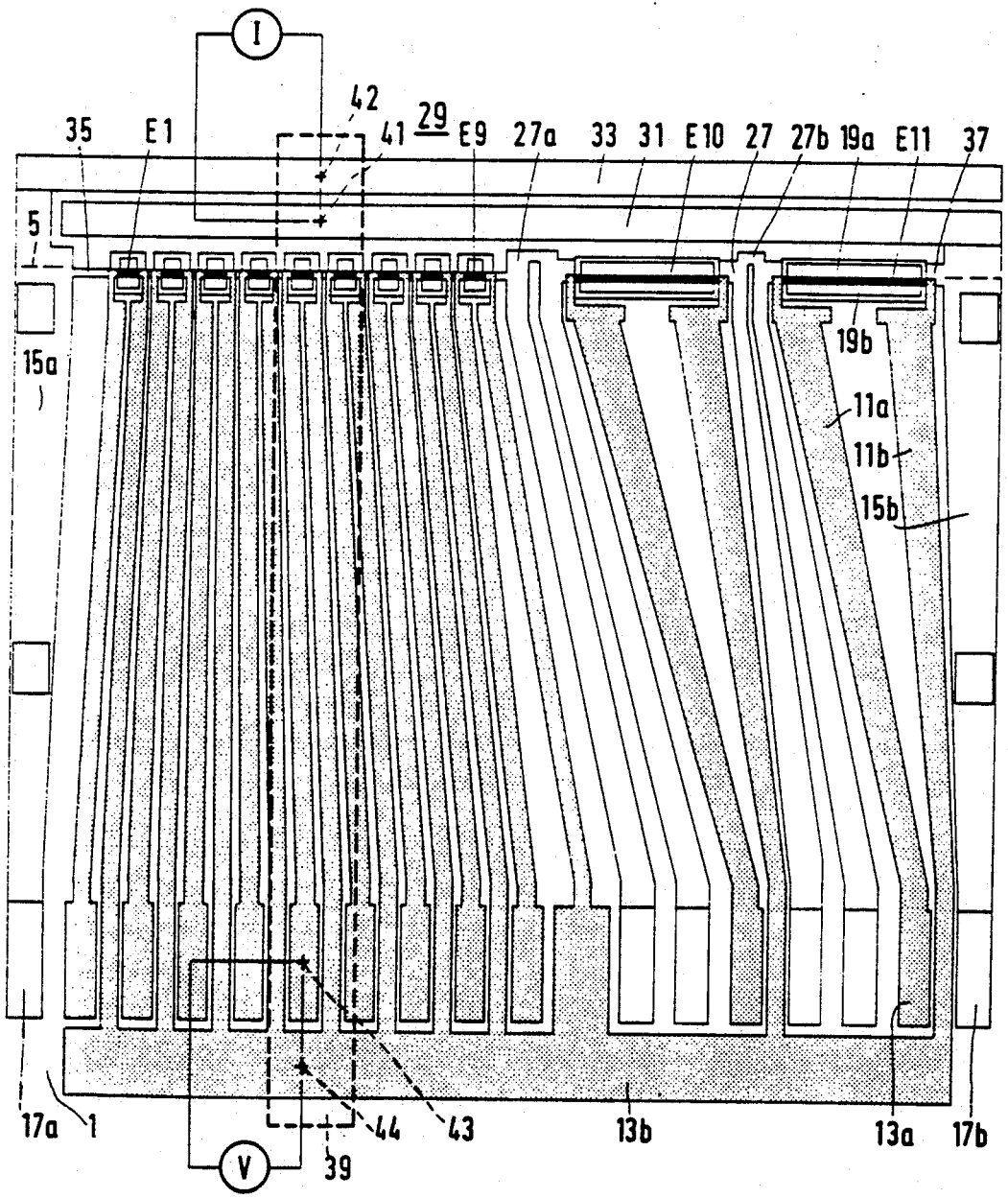

Referring to FIGS. 2 and 3, the method according to the invention will now be described in greater detail. Starting from the substrate 1, a magnetic head structure is provided layer by layer by means of a thin-film technique. When the magnetic head structure is being built up, an uninterrupted electrically conducting layer 27 is provided on the insulation layer 9 by means of, for example sputtering or vapour-deposition of Au, and by subsequent structuring. The uninterrupted layer 27 has projecting parts, in this example the projecting parts 27a and 27b which extend as far as an area 29 located in front of the envisaged tape contact face 5. Preferably simultaneously with the structuring of the uninterrupted layer 27, the required second connection tracks 15a and 15b and the second connection faces 17a and 17b are formed, which tracks and faces are electrically connected to the uninterrupted layer. Furthermore two tracks 31 and 33 extending parallel to the uninterrupted layer 27 and extending mutually parallel may be formed during the same step of the method. One of the tracks 31 is electrically connected to a first end 35 of the uninterrupted layer 27 and the other track 33 is electrically connected to a second end 37 of the uninterrupted layer 27. Both layers 31 and 33 are present in the area 29.

After the insulation layer 21 has been provided, the MR elements E1 to E11 provided with barber poles and the associated first connection tracks 11a and 11b and first connection faces 13a and 13b are formed. After the insulation layer 23 has been provided, the flux guides 19a and 19b are formed. Subsequently the electric resistance of the MR elements is measured, followed by a measurement to check the magnetic behaviour of the MR elements. To this end, the ends 35 and 37 of the electrically conducting uninterrupted layer 27 are connected to an AC source I, and the voltage across the MR elements E1 to E11 is measured by means of a voltmeter V.

The presence of the electric tracks 31 and 33 provides the possibility of performing said measurement by means of a simple mechanical device which comprises a displaceable supporting element 39 having four pins 41 to 44. The pins 41 and 42 are contact pins for connecting the current source to the electric tracks 31 and 33 and the pins 43 and 44 are measuring pins for connecting the voltmeter to the first connection faces 13a and 13b.

After measuring, the manufacture of the approved product can be continued. To this end, the counterblock 3 is provided, and subsequently the tape contact face 5 is formed by means of, for example, sawing, grinding and polishing. When the tape contact face 5 is being formed, the electric tracks 31 and 33, as well as the projecting track parts 27a and 27b of the uninterrupted layer 27 are removed, resulting in the magnetic head as shown in FIGS. 1 and 2, provided with three conductors C1, C2 and C3 which function as separate bias windings.

The invention is of course not limited to the embodiment shown. The method according to the invention can also be used for manufacturing magnetic heads having a larger or smaller number of gaps and/or electric conductors than the number shown. It is further to be noted that the electric tracks may be dispensed with in measurements in which all MR elements are measured simultaneously.

We claim:

1. A method of manufacturing on a substrate a thin film magnetic head structure, the structure comprising a row of thin film magnetic heads and a common tape contact face, each head comprising a magnetoresistive (MR) sensing element positioned adjacent the head face, a first set of connection tracks comprising a pair of connection tracks for each MR element, and a second set of connection tracks comprising at least two pair of connection tracks, each pair for biasing at least one MR element, the method comprising the steps of:

(a) forming an insulation layer on the substrate;
(b) forming an electrically conducting layer on the insulating layer;
(c) patterning the conductive layer to form an electrically uninterrupted layer comprising the second set of connection tracks, each pair interconnected by projecting parts which extend beyond the envisaged tape contact face;
(d) using the uninterrupted layer as a test conductor to measure properties of the MR elements; and
(e) forming the tape contact face by removing portions of the structure including the projecting parts, whereby the second set of track pairs are electrically separated.

2. A method as claimed in claim 1, characterized in that a third set of two spatially separated electrically conducting tracks are provided during formation of the magnetic head structure, which tracks extend parallel to and are present in an area located beyond the tape contact face to be formed, said tracks each being connected to a different end of the electrically conducting uninterrupted layer, each track being a terminal for application of a current during the measurement and each being removed when the tape contact face is formed.

* * * * *